(12) United States Patent
Chaniot et al.

(10) Patent No.: US 6,364,564 B1
(45) Date of Patent: Apr. 2, 2002

(54) FINGER DEVICE FOR BLOCKING ONE COMPONENT RELATIVE TO ANOTHER

(75) Inventors: Daniel Chaniot, Marignane; François Lenhardt, La Fare les Olivers; Jean Paul Castan, Velaux, all of (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/456,708

(22) Filed: Dec. 9, 1999

(30) Foreign Application Priority Data

Dec. 11, 1998 (FR) .............................................. 98 15661

(51) Int. Cl.⁷ ................................................ F16C 11/00
(52) U.S. Cl. ........................... 403/131; 403/91; 403/90; 403/123; 403/143
(58) Field of Search .................................. 403/122, 123, 403/124, 128, 131, 141, 142, 143, 91, 84, 87, 90

(56) References Cited

U.S. PATENT DOCUMENTS

| | | | | |
|---|---|---|---|---|
| 1,656,294 A | * | 1/1928 | Sanford | |
| 2,000,172 A | * | 5/1935 | Hanson | |
| 2,230,853 A | * | 2/1941 | Wells | |
| 2,392,063 A | * | 1/1946 | Reimann et al. | |
| 2,674,169 A | * | 4/1954 | Sawyer | |
| 3,364,778 A | * | 1/1968 | Griffen | |
| 3,627,339 A | * | 12/1971 | Burweger | |
| 4,319,788 A | * | 3/1982 | Hackman | |
| 4,911,564 A | * | 3/1990 | Baker | |
| 5,473,955 A | * | 12/1995 | Stinson | |
| 5,642,956 A | * | 7/1997 | Hale | |

FOREIGN PATENT DOCUMENTS

| GB | 2 027 115 | * | 2/1980 |
|---|---|---|---|
| GB | 2 273 043 | * | 8/1994 |

* cited by examiner

Primary Examiner—Lynne H. Browne
Assistant Examiner—Tomlyne A Malcolm
(74) Attorney, Agent, or Firm—Marshall, Gerstein & Borun

(57) ABSTRACT

A device for blocking first and second components (1, 2) relative to one another may be provided with first and second parts (3, 4) capable of cooperating with one another in order to effect the blocking, the first part (3) being carried by the first component (1) and being provided with a duct (15) and the second part (4) being carried by the second component (2) and being provided with a blocking finger (24) capable of being introduced frictionally into the duct (15). The first part (3) may have a first pivot system (8) with a pivot (10) that can rotate relative to the first component (1); the duct may be formed by a diametral conduit (15) pierced in the pivot (10) of the first pivot system (8); and the second part (4) may include a second pivot system (23) with which the blocking finger (24) is integral so as to be capable of tilting relative to the second component (2).

12 Claims, 3 Drawing Sheets

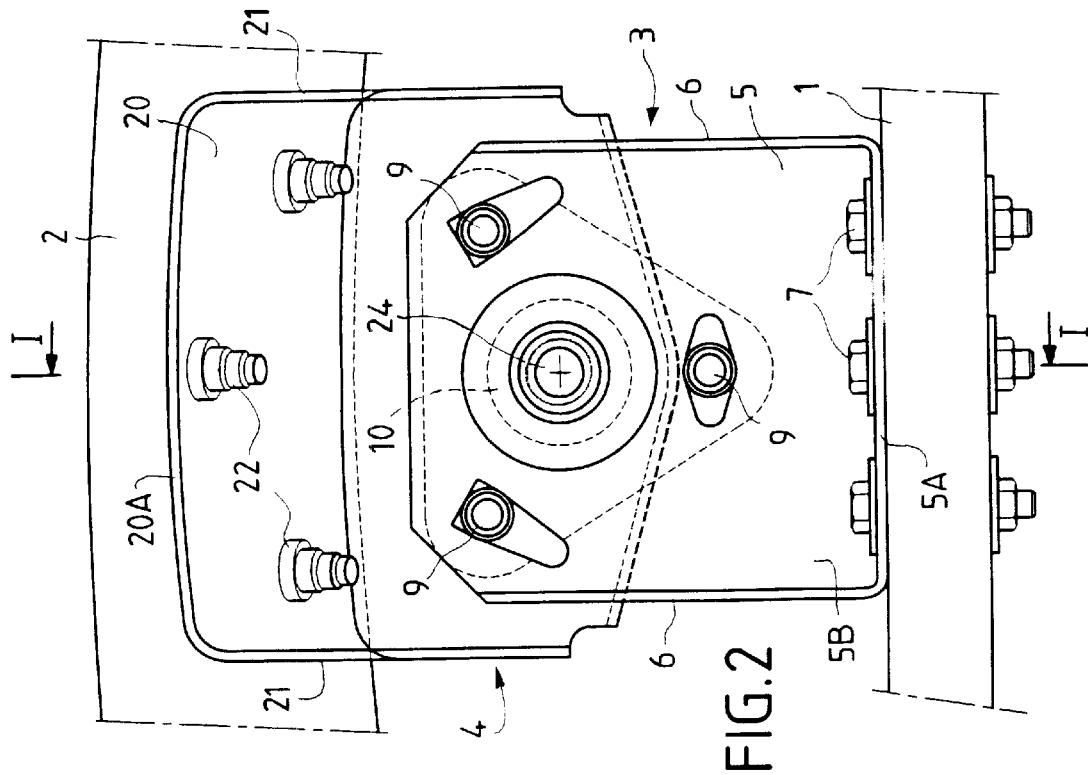
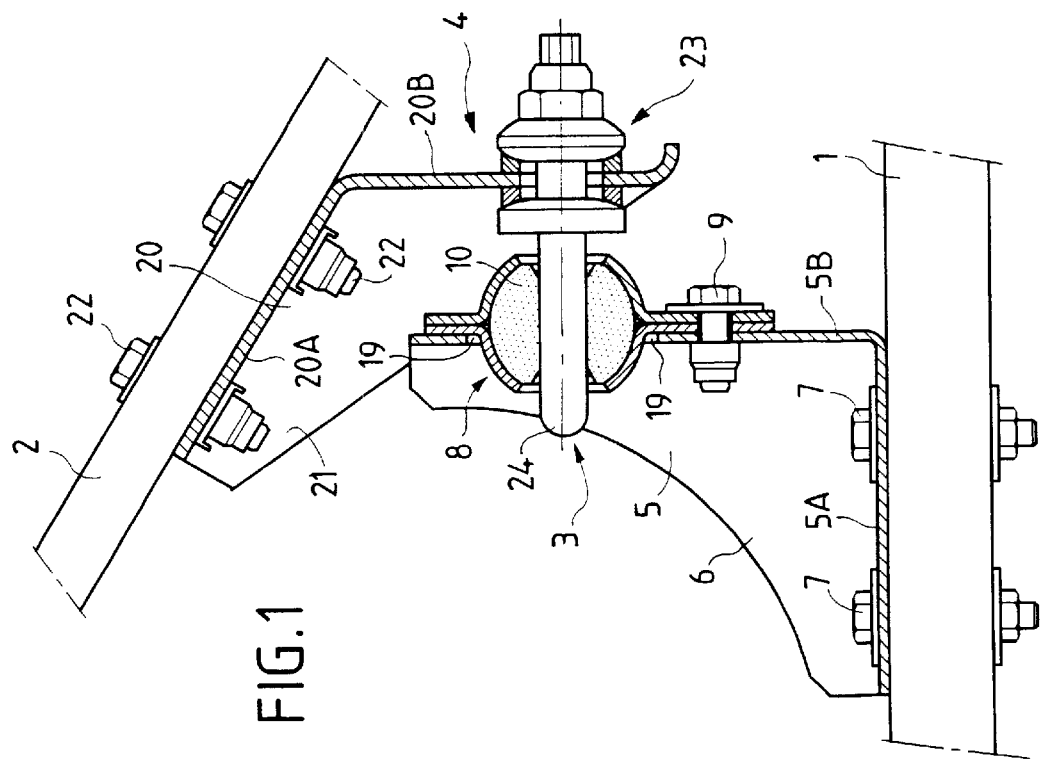

FINGER DEVICE FOR BLOCKING ONE COMPONENT RELATIVE TO ANOTHER

BACKGROUND OF THE INVENTION

The present invention relates to a finger device for blocking one component relative to another, said components also being capable of being connected to one another, for example by means of a system allowing them to slide relative to one another.

Such a blocking device is already known, n comprising a first part and a second part which are capable of cooperating with one another in order to effect said blocking, said first part being carried by one of the components and being provided with a duct, while said second part is carried by the other of said components and is provided with a blocking finger capable of being introduced frictionally into said duct.

Such a known blocking device is advantageous, since it makes it possible to connect the two components to one another, without the need to have a multiplicity of fastening means, such as bolts, screws, etc., and to make a connection between said components in zones of the latter where access is difficult or impossible. However, it has the disadvantage of making it necessary to carry out, to the most exacting standards, the manufacture of said components, the arrangements of said duct and of said blocking finger on said components and the relative positioning of said components just before said blocking finger is introduced into said duct. In practice, since these operations can never be executed perfectly, it becomes necessary to provide position adjustment shims and/or to fit said blocking finger forcibly into said duct. The result of this is that the mounting of two such components is difficult, lengthy and awkward and is difficult to repeat reliably, that the blocking finger and duct quickly become worn and that the forces are poorly transmitted between said components.

SUMMARY OF THE INVENTION

The object of the present invention is to overcome these disadvantages. It relates to a blocking device of the type described above, making it possible to facilitate the mounting and interchangeability of the components and to improve the transmission of forces between these, while at the same time avoiding the need for manufacturing and fitting adjustment shims and for very strict manufacturing tolerances.

For this purpose, according to the invention, the device for blocking first and second components relative to one another, said device comprising first and second parts capable of cooperating with one another in order to effect said blocking, said first part being carried by said first component and being provided with a duct, while said second part is carried by said second component and is provided with a blocking finger capable of being introduced frictionally into said duct, is notable in that:
  said first part comprises a first pivot system, the pivot of which can rotate relative to said first component, and said duct is formed by a diametral conduit pierced in said pivot of said first system; and
  said second part comprises:
    a second pivot system, with which said blocking finger is integral so as to be capable of tilting relative to said second component; and
    means for fixing the position and orientation of said blocking finger relative to said second component.

It can thus be seen that, by virtue of said first and second pivot systems, it is easy, when said second pivot system is left free in terms of rotation by said fixing means, to cause said blocking finger and said duct to cooperate as a result of the introduction of said finger into the latter while said components are being put in place relative to one another, the two pivot systems also absorbing the errors in the positioning and centering of said parts of the blocking device. By contrast, when said components have reached their nominal relative position and said fixing means are actuated in order to block said second pivot system, said components are blocked relative to one another orthogonally to said blocking finger and the transmission of forces from one component to the other takes place at least partially by means of said blocking finger.

Preferably, in order to make it even easier to introduce said blocking finger into the duct and put said first and second parts in place relative to one another during the approach of the components, there is provision for mounting said first pivot system on said first part by controllable clamping means, such as screws, in such a way that the connection between said first pivot system and said first part can be made loose during said approach, but rigid when said components are in their nominal relative position.

The cooperation between said first and second parts is facilitated if said first part comprises a first lug projecting relative to said first component and interlocking said first pivot system with said first component. For this purpose, it is also advantageous if said second part comprises a second lug projecting relative to said second component and interlocking said second pivot system with said second component.

In an advantageous embodiment, there is provision for:
  said means for fixing the position and orientation of said blocking finger relative to said second component to comprise a screw formed by a threaded part of said blocking finger and a nut capable of cooperating with said screw;
  said second pivot system to comprise:
    a first spherical face integral with said blocking finger and centered on the axis of the latter;
    a second spherical face made in one face of said nut;
    a first washer comprising a plane face on one side and a third spherical face on the other side, said third spherical face being complementary to said first spherical face of said blocking finger so as to be capable of forming a pivot joint; and
    a second washer comprising a plane face on one side and a fourth spherical face on the other side, said fourth spherical face being complementary to said second spherical face of said nut so as to be capable of forming a pivot joint;
  said second lug to be provided with an orifice, through which said blocking finger passes; and
  said first and second washers, through which said blocking finger passes, to be arranged on either side of said second lug, in such a way that, by the screwing of said nut onto said screw:
    the plane face and the third spherical face of said first washer are laid respectively against a plane face of said second lug and against said first spherical face of said blocking finger; and
    the plane face and said fourth spherical face of said second washer are laid respectively against the other plane face of said second lug and against said second spherical face of said nut.

In such an embodiment of the invention, said blocking finger may comprise a shoulder carrying said first spherical face and said threaded part forming a screw may be located on that side of said shoulder which is opposite said actual blocking finger, at the same time prolonging the latter.

In order to make it easier to produce the elements of said second pivot system, it is advantageous:

if said first spherical face is convex, while said third spherical face is concave; and/or if said second spherical face is convex, while said fourth spherical face is concave.

In order to make it possible to screw said nut easily onto the screw, preferably up to a nominal torque, it is advantageous if said blocking finger comprises gripping means (for example plane faces) capable of being used for holding (for example, by means of a wrench or the like) said blocking finger during the screwing of said nut.

In an advantageous embodiment, said first pivot system comprises two flanges provided with respective spherical indentations which have pierced bottoms and between which said pivot is retained so as to be capable of rotating freely.

BRIEF DESCRIPTION OF THE DRAWINGS

The figures of the accompanying drawing will make it easy to understand how the invention can be implemented. In these figures, identical references designate like elements.

FIG. 1 is a side elevation view, with a partial section taken along the plane I—I of FIG. 2 passing through the axis of the centering finger, of the blocking device according to the present invention, the two parts of said device being in the cooperating position.

FIG. 2 is a front elevation view of the blocking device of FIG. 1.

DETAILED DESCRIPTION OF THE PREFERRED EMBODIMENTS

Figure 3:
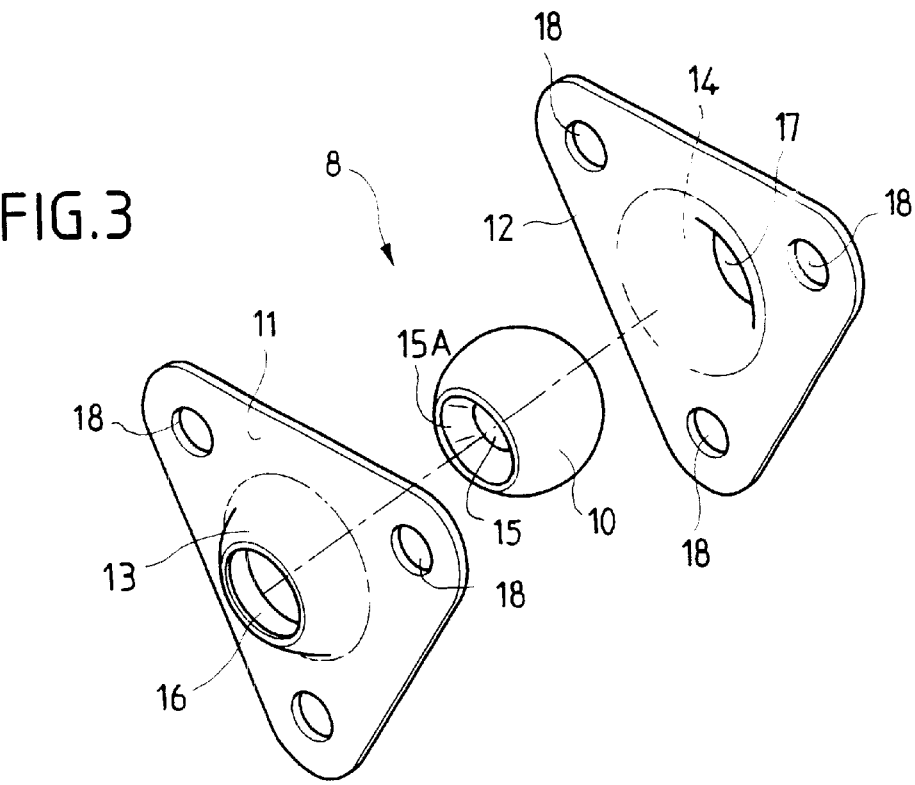
FIG. 3 is an exploded perspective view illustrating the components forming one of the pivot systems and their arrangement.

FIGS. 1 and 2 show two components 1 and 2 which are, for example, connected to one another slidably by known means, not illustrated, and which are blocked relative to one another by the device according to the present invention. This blocking device comprises a part 3 integral with the component 1 and a part 4 integral with the component 2, said parts 3 and 4 cooperating with one another.

The part 3 of said blocking device comprises:

a lug 5 which, for example, is in the form of an angled piece and is provided with lateral end reinforcements 6 and which is fastened to the component 1, by means of screws 7, with its wing 5A laid against said component; and a pivot system 8 fastened by means of screws 9 to the wing 5B of the lug 5 so as to project relative to the component 1.

The pivot system 8 (see also FIG. 3) comprises a pivot 10, for example made of steel or synthetic material, and two flanges 11 and 12, for example made of deep-drawn sheet metal, which are each provided with a spherical indentation 13 or 14 intended for receiving said pivot 10. When the two flanges 11 and 12 are laid against one another, at the same time retaining the pivot 10 in their spherical indentations 13 and 14, as illustrated in FIG. 1, said pivot can rotate freely in said indentations.

The pivot 10 is pierced with a duct or diametral throughbore 15, the ends of which may be widened by means of chamfers 15A. The bottoms of the spherical indentations 13 and 14 are likewise pierced with apertures 16 and 17 passing through the thickness of said flanges 11 and 12. The latter comprise, furthermore, holes 18 for the passage of screws 9 for fastening to the wing 5B of the angle piece 5. In addition to the holes for the passage of said fastening screw 9, said wing 5B comprises an aperture 19 for accommodating therein, in part, the pivot 10 and one of the spherical indentations 13 or 14, when the flanges 11 and 12 are laid against one another and against said wing 5B, to which they are fastened by means of said screws 9.

The part 4 of the blocking device comprises:

a lug 20 which is, for example, in the form of an open angle piece provided with lateral end reinforcements 21 and which is fastened to the component 2, by means of screws 22, with its wing 20A laid against said component 2; and a pivot system 23 carrying a blocking finger 24 and fastened to the wing 20B of the lug 20 so as to project relative to the component 2.

Figure 4:
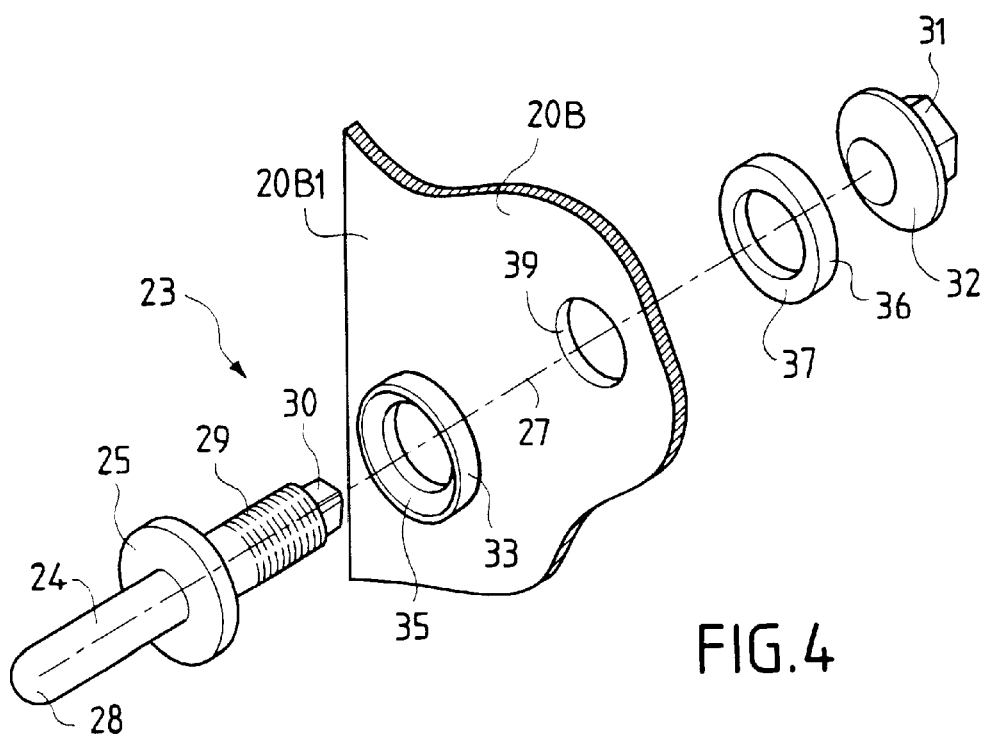
FIG. 4 is an exploded perspective view illustrating the components forming the other pivot system and their arrangement.
Figure 5:
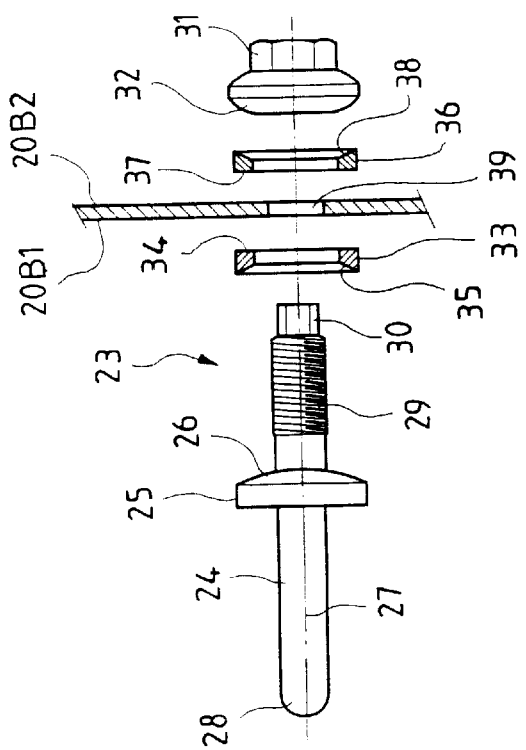
FIG. 5 is a partially sectional axial view of the pivot system of FIG. 4.

The blocking finger 24, which, for example, is produced from steel, titanium or a light alloy, comprises (see also FIGS. 4 and 5) a shoulder 25 provided with a convex spherical face 26 centered on the axis 27 of said blocking finger. That end 28 of the blocking finger 24 which is opposite the shoulder 25 is in the form of a rounded tip. On that side of the shoulder 25 which is opposite the blocking finger 24, the latter is prolonged by a threaded part 29 which is coaxial to the axis 27 and is itself prolonged by a square end 30.

Associated with the blocking finger 24 are:

a nut 31 capable of being screwed onto the threaded part 29 and comprising a convex spherical face 32;

a washer 33 comprising a plane face 34 on one side and a concave spherical face 35 on the other side, said concave spherical face 35 being capable of cooperating with the convex spherical face 26 of the shoulder 25 in order to form a pivot joint;

another washer 36 comprising a plane face 37 on one side and a concave spherical face 38 on the other side, said concave spherical face 38 being capable of cooperating with the convex spherical face 32 of the nut 31 in order to form a pivot joint.

An orifice 39 is provided in the wing 20B of the lug 20 for the free passage of the threaded part 29 of the blocking finger 24. The latter is mounted on the wing 20B in such a way that the washers 33 and 36 have said threaded part 29 passing through them and are arranged on either side of said wing 20B:

the washer 33 is placed on the threaded part 29, on the same side as the face 20B1 of the wing 20B, with its plane face 34 directed toward said face 20B1 and with its concave spherical face 35 directed toward the convex spherical face 26 of the shoulder 25; and the washer 36 is placed on the threaded part 29, on the same side as the other face 20B2 of the wing 20B, with its plane face 37 directed toward said face 20B2 and with its concave spherical face 38 directed toward the convex spherical face 32 of the nut 31.

Thus, by screwing the nut 31 onto the threaded part 29, it is possible simultaneously to lay:

- the convex spherical face 32 of the nut 31 against the concave spherical face 38 of the washer 36;
- the plane face 37 of the washer 36 against the face 20B2 of the wing 20B;
- the plane face 34 of the washer 33 against the face 20B1 of the wing 20B; and
- the convex spherical face 26 of the shoulder 25 against the concave spherical face 35 of the washer 33.

While the nut 31 is being screwed, for example by means of a torque wrench (not illustrated), the blocking finger 24 can be prevented from rotating by means of another wrench (likewise not illustrated) gripping the square end 30.

Initially, when the components 1 and 2 are apart from one another, the screws 9 are not tightened, so that the pivot system 8 is mounted loosely relative to the lug 5, and the nut 31 is likewise slackened, so that the blocking finger 24 is connected loosely to the lug 20.

The components 1 and 2 are subsequently brought closer to one another, at the same time being guided and/or held by means, for example sliding means (not illustrated), which connect them, and, while they are being brought closer to one another in this way, the blocking finger 24, loosely connected to the component 2 by means of the lug 20, is easily introduced into the diametral passage 15 of the pivot 10 which is loosely connected to the component 1 by means of the flanges 11 and 12 and the lug 5.

By virtue, on the one hand, of the loose connections between the pivot system 8 and the component 1 and between the blocking finger 24 and the component 2 and, on the other hand, of the pivot joints formed by the pivot 10 and the flanges 11 and 12 and by the spherical faces 26, 32, 35 and 38, the pivot systems 8 and 23 adapt perfectly, without impeding it, to the act of bringing the components 1 and 2 closer to one another. When these are in their nominal relative position, in which they have to be blocked (the nominal position being determined, for example, by said sliding means), it is sufficient to tighten the screws 9 and the nut 31, for example to a specific torque, in order to fix said nominal position. By virtue of such a process, no mounting stress is exerted by one of the pivot systems 8 or 23 on the other, even though these systems are capable of transmitting forces from one of the components to the other.

Figure 6:
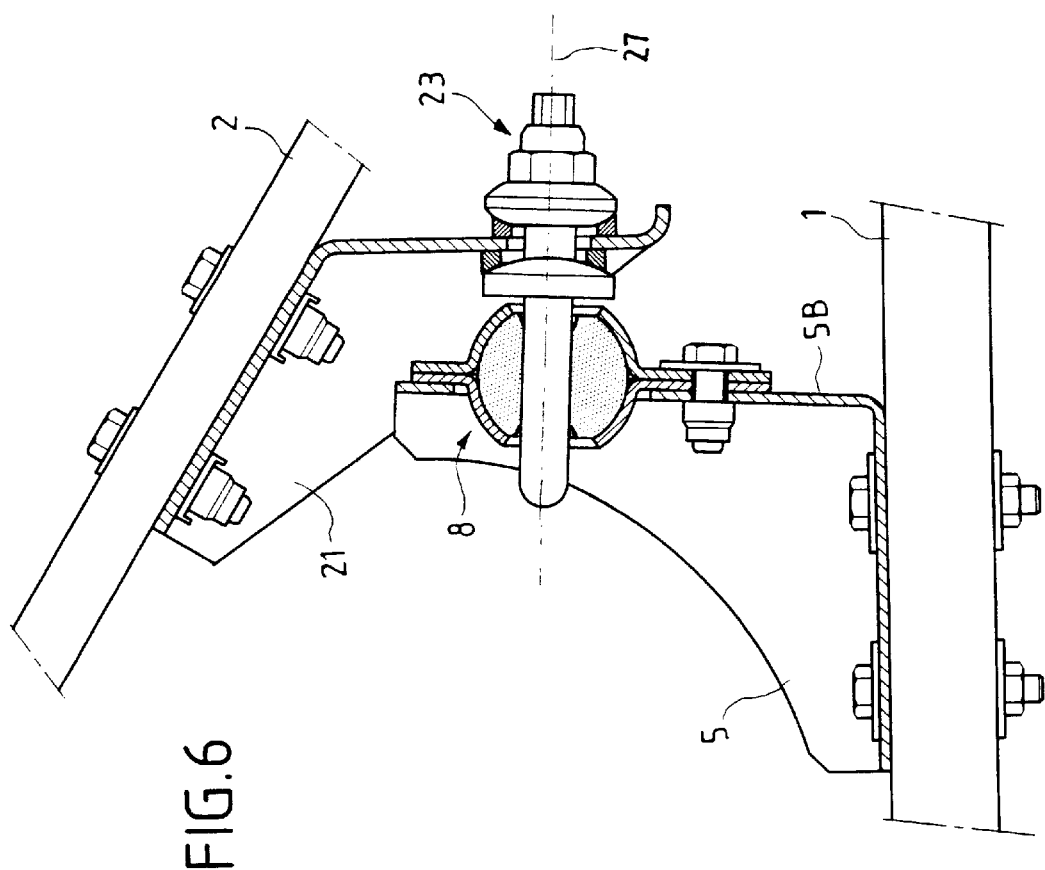
FIG. 6 corresponds to FIG. 1 and shows the relative arrangement of the blocking device according to the invention in the event of faults in the alignment of the components and/or of the two parts forming the blocking device.

In the section shown in FIG. 1, it was assumed that the mounting of the components 1 and 2 was faultless, whereas FIG. 6 illustrates the blocking device of the invention in the situation where there are angular faults between the lugs 5 and 20.

What is claimed is:

1. An apparatus, comprising:
    first and second parts (3, 4) capable of cooperating with one another in order to effect blocking of said first and second parts (3, 4) relative to one another, said first part (3) being capable of being carried by a first component (1) and being provided with a duct (15), said second part (4) being capable of being carried by a second component (2) and being provided with a blocking finger (24) capable of being introduced frictionally into said duct (15),
    wherein said first part (3) comprises a first pivot system (8) having a pivot (10) that can rotate relative to said first component (1) when said first part (3) is carried by said first component (1), said duct being formed by a diametral conduit (15) in said pivot (10) of said first pivot system (8), and
    wherein said second part (4) comprises a second pivot system (23) with which said blocking finger (24) is integral so as to be capable of tilting relative to said second component (2) when said second part (4) is carried by said second component (4) and means (29, 31) for fixing the position and orientation of said blocking finger (24) relative to said second component (2) when said second part (4) is carried by said second component (2).

2. The apparatus as claimed in claim 1, wherein said first pivot system (8) is capable of being mounted on said first part (3) by controllable clamping means (9).

3. The apparatus as claimed in claim 1, wherein said first part (3) comprises a first lug (5) and is capable of interlocking said first pivot system (8) with said first component (1).

4. The apparatus as claimed in claim 1, wherein said second part (4) comprises a second lug (20) and is capable of interlocking said second pivot system (23) with said second component (2).

5. The apparatus as claimed in claim 4, wherein said means for fixing the position and orientation of said blocking finger (24) relative to said second component (2) comprise a screw (29) formed by a threaded part of said blocking finger (24) and a nut (31) capable of cooperating with said screw,
    wherein said second pivot system (23) comprises:
        a first spherical face (26) integral with said blocking finger (24) and centered on the axis (27) of said blocking finger (24);
        a second spherical face (32) of said nut (31);
        a first washer (33) comprising a plane face (34) on one side and a third spherical face (35) on another side, said third spherical face (35) being complementary to said first spherical face (26) of said blocking finger (24) so as to be capable of forming a pivot joint; and
        a second washer (36) comprising a plane face (37) on one side and a fourth spherical face (38) on another side, said fourth spherical face (38) being complementary to said second spherical face (32) of said nut (31) so as to be capable of forming a pivot joint,
    wherein said second lug (20) is provided with an orifice (39) through which said blocking finger (24) passes, and
    wherein said first and second washers (33, 36) through which said blocking finger (24) passes are arranged on either side of said second lug (20, in such a way that, by the screwing of said nut (31) onto said screw (29), said plane face (34) and said third spherical face (35) of said first washer (33) are laid respectively against a plane face (20B1) of said second lug (20) and against said first spherical face (26) of said blocking finger (24) and said plane face (37) and said fourth spherical face (38) of said second washer (36) are laid respectively against the other plane face (20B2) of said second lug (20) and against said second spherical face (32) of said nut (31).

6. The apparatus as claimed in claim 5, wherein said blocking finger (24) comprises a shoulder (25) carrying said first spherical face (26) and wherein said threaded part (29) forms a screw located on a side of said shoulder (25) opposite said blocking finger (24).

7. The apparatus as claimed in claim 5, wherein said first spherical face (26) is convex and wherein said third spherical face (35) is concave.

8. The apparatus as claimed in claim 5, wherein said second spherical face (32) is convex and wherein said fourth spherical face (38) is concave.

9. The apparatus as claimed in claim 5, wherein said blocking finger (24) comprises gripping means (30) capable of being used for holding said blocking finger (24) during screwing of said nut (31).

10. The apparatus as claimed in claim 1, wherein said first pivot system (8) comprises two flanges (11, 12) provided with respective spherical indentations (13,14) which have pierced bottoms and between which said pivot (10) is retained so as to be capable of rotating freely.

11. The apparatus as claimed in claim 1, wherein the free end (28) of said blocking finger (24) is shaped into a rounded tip.

12. The apparatus as claimed in claim 1, wherein at least one end (15A) of said diametral conduit (15) is widened.

\* \* \* \* \*